H. R. FRENCH.
Die for Molding Buttons.

No. 211,090. Patented Jan. 7, 1879.

ATTEST:
Geo. H. Fraser.
Walter W. Scott

INVENTOR:
Henry R. French,
By his Attorneys,
Burke, Fraser & Connett

UNITED STATES PATENT OFFICE.

HENRY R. FRENCH, OF FITCHBURG, ASSIGNOR TO VULCANITE MANUFACTURING CO., OF LEOMINSTER, MASSACHUSETTS.

IMPROVEMENT IN DIES FOR MOLDING BUTTONS.

Specification forming part of Letters Patent No. 211,090, dated January 7, 1879; application filed October 5, 1878.

*To all whom it may concern:*

Be it known that I, HENRY R. FRENCH, of Fitchburg, in the county of Worcester and State of Massachusetts, have invented certain Improvements in Dies for Molding Buttons, of which the following is a specification:

This invention relates to dies for molding buttons having capped shanks, of which the ordinary cuff-button is a type; and the invention consists in the combination of a hollow part or mold, a halved or divided plunger working therein, and another plunger working in the divided plunger, all operating substantially as hereinafter described, whereby the button complete may be molded from some plastic or suitable material, all as will be hereinafter set forth.

Figure 1:
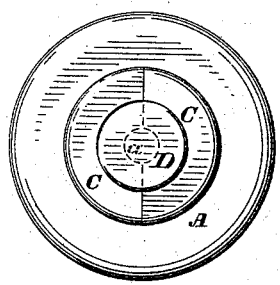
Figure 2:
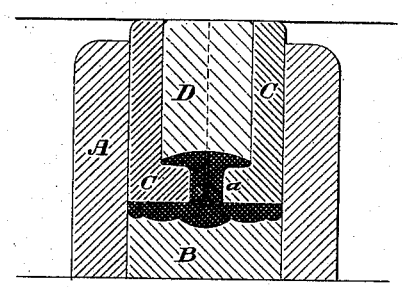
Figure 3:
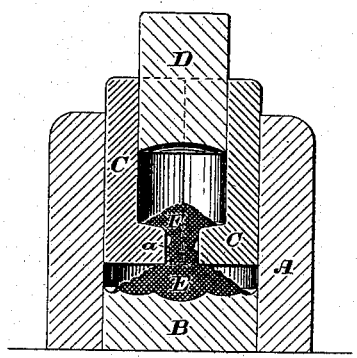
Figure 4:
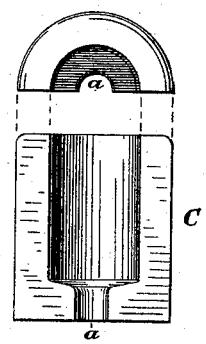

In the drawings, Figure 1 is a plan of the die; and Fig. 2 is a vertical mid-section of the same, showing the molded button therein. Fig. 3 is a sectional view, illustrating the mode of using the die; and Fig. 4 is a plan and elevation of one of the parts of the same.

A is a cylinder, bored true and smooth, and having an internal diameter equal to the diameter of the head of the button.

B is a bottom, which fits snugly, but loosely, into the same, and which is shaped or figured on its upper side to impart the proper ornamental configuration to the button-face.

C is a split cylinder, having a bore, *a*, in its bottom to form the shank of the button, the bottom of the cylinder being of the proper thickness to give the shank the necessary length. The inner diameter or bore of the cylinder equals the diameter of the cap on the shank of the button.

D is a cylinder, which fits into the cylinder C, and which serves to form the face of the cap on the button-shank. The parts C and D project above the cylinder A, as shown.

Although the bores of the parts A and C are shown as cylindrical, they may be elliptical, square, or polygonal in section as well, or of any contour desired, without departing from my invention; or one may differ in contour from the other, so that B and C fit into A and D fits into C.

The cylinder C is split or formed into two or more parts by vertical divisions. An elevation and plan of one of the divisions is shown in Fig. 4.

Among other materials for the manufacture of buttons with my die I contemplate employing pulverized horn and hoof, either alone or combined with other substances, and I will describe the operation when said material is used.

A number of the cylinders A, with the bottoms B in place, are set upon a plate or directly upon the bed of a press, and some of the material for the button, (marked E in Fig. 3,) is weighed or measured out, and put into each. The split cylinders C are then inserted into A, and another portion, F, of the material is dropped in. The parts D are then put in place in the cylinders C, and the whole subjected to great pressure and heat.

After cooling, the buttons may be removed by forcing the parts C D, together with the buttons and the bottoms B, through the part A. The parts of the cylinder C are afterward removed laterally, leaving the button complete or ready for polishing.

If a more plastic material than pulverized horn is used in the manufacture, it may all be inserted at once into the cylinder A before the part C is set in place, as it will flow up through the opening *a*, and form the cap of the shank.

By using more or less of the material a thicker or thinner button will be produced, and no overflow is required.

The removable bottom B is a matter of convenience, as the button may be made and removed with the said bottom fixed in place; or it would be possible to cut the mold for the button-face in the plate upon which the dies rest when in the press.

I claim as my invention—

1. A die for molding cap-shanked buttons consisting of a hollow part or mold, A, with suitable bottom or face die, B, the split or divided plunger C, working in the mold A, and the plunger D, working in the divided plunger C, substantially as and for the purpose herein specified.

2. A die for forming or molding buttons with capped shanks, having a cylindrical or prismatic split follower or plunger, C, arranged to play snugly in a correspondingly-shaped part, A, in such a manner that the surplus material, if any, not required to form the button will be added to its thickness and require no overflow, substantially as set forth.

3. The combination of the part A, having a uniform bore, the bottom B, having the configuration to be imparted to the button-face cut upon it, the split or halved part C, having the bore $a$ to form the button-shank, and the part D, having its lower face formed to produce the cap of the shank, the last three parts being adapted to be pushed through the part A, substantially as and for the purposes set forth.

In witness whereof I have hereunto signed my name in the presence of two subscribing witnesses.

HENRY R. FRENCH.

Witnesses:
DAVID H. MERRIAM,
T. GUILFORD.